United States Patent
Abdelfattah Aly

(10) Patent No.: US 11,533,011 B2
(45) Date of Patent: Dec. 20, 2022

(54) ACTUATOR DRIVER CIRCUIT WITH SELF-RESONANCE TRACKING

(71) Applicant: QUALCOMM Incorporated, San Diego, CA (US)

(72) Inventor: Khaled Mahmoud Abdelfattah Aly, Laguna Hills, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 16/808,885

(22) Filed: Mar. 4, 2020

(65) Prior Publication Data

US 2021/0281202 A1  Sep. 9, 2021

(51) Int. Cl.
*H02P 25/034* (2016.01)
*G06F 3/01* (2006.01)

(52) U.S. Cl.
CPC ............ *H02P 25/034* (2016.02); *G06F 3/016* (2013.01)

(58) Field of Classification Search
CPC ............................... H02P 25/034; G06F 3/016
See application file for complete search history.

(56) References Cited

U.S. PATENT DOCUMENTS

| | | | | |
|---|---|---|---|---|
| 4,811,835 A * | 3/1989 | Bullivant | ............... | G05D 19/02 318/128 |
| 6,229,402 B1 * | 5/2001 | Kataoka | ................ | H02N 2/142 331/34 |
| 9,325,324 B1 * | 4/2016 | Gupta | ..................... | H03L 7/099 |
| 2005/0068097 A1 * | 3/2005 | Kirn | .................... | H03F 3/45973 330/2 |
| 2005/0116583 A1 * | 6/2005 | Nishio | ................... | H02N 2/008 310/317 |
| 2005/0231069 A1 * | 10/2005 | Yamazaki | ............... | G04C 3/12 310/317 |
| 2007/0046144 A1 * | 3/2007 | Urano | .................... | H02N 2/004 310/317 |
| 2008/0278037 A1 * | 11/2008 | Higashionji | ........ | H01L 41/0906 310/338 |
| 2010/0046772 A1 * | 2/2010 | Veau | ...................... | H04R 3/007 381/103 |
| 2012/0133307 A1 * | 5/2012 | Furuya | .................. | H01L 41/042 318/116 |
| 2012/0229264 A1 * | 9/2012 | Company Bosch | .. | B06B 1/0253 340/407.1 |
| 2014/0118126 A1 * | 5/2014 | Garg | ....................... | G06F 3/016 340/407.1 |
| 2016/0144404 A1 * | 5/2016 | Houston | ............... | H02K 33/00 318/114 |
| 2018/0158289 A1 * | 6/2018 | Vasilev | .................... | G08B 6/00 |

(Continued)

*Primary Examiner* — Tadesse Hailu
(74) *Attorney, Agent, or Firm* — Patterson & Sheridan, LLP

(57) ABSTRACT

Certain aspects of the present disclosure generally relate to methods and apparatus for driving haptic actuators. An example actuator driver circuit generally includes a driver and calibration circuitry. The driver has at least one output for coupling to at least one input of an actuator. The calibration circuitry is configured to: detect a phase of a voltage signal at the at least one output of the driver, detect a phase of a current signal at the at least one output of the driver, determine a phase difference between the phase of the voltage signal and the phase of the current signal, and adjust a frequency of an oscillating signal for the driver, based at least in part on the phase difference.

20 Claims, 5 Drawing Sheets

(56) References Cited

U.S. PATENT DOCUMENTS

| | | | |
|---|---|---|---|
| 2018/0301060 A1* | 10/2018 | Israr | G09B 21/003 |
| 2019/0121333 A1* | 4/2019 | Cella | G05B 23/024 |
| 2019/0248008 A1* | 8/2019 | Noro | B25J 9/1633 |
| 2019/0294247 A1* | 9/2019 | Hu | B06B 1/0207 |
| 2019/0335087 A1* | 10/2019 | Tabuchi | G02B 7/09 |
| 2020/0139403 A1* | 5/2020 | Palit | G05D 19/02 |
| 2020/0271745 A1* | 8/2020 | Das | G01R 27/02 |
| 2020/0275222 A1* | 8/2020 | Bernal Castillo | G10K 11/17883 |
| 2020/0356173 A1* | 11/2020 | Bajaj | H02P 25/064 |
| 2020/0389113 A1* | 12/2020 | Palit | H02P 25/06 |

* cited by examiner

ACTUATOR DRIVER CIRCUIT WITH SELF-RESONANCE TRACKING

BACKGROUND

Field of the Disclosure

Certain aspects of the present disclosure generally relate to electronic devices and, more particularly, to a driver for haptic actuators.

Description of Related Art

Various electronic devices (e.g., portable computing devices, cellular telephones, smart phones, tablet computers, portable digital assistants (PDAs), portable game consoles, wearable devices, and other battery-powered devices) offer an ever-expanding array of features and services, and provide users with unprecedented levels of access to information, resources, and communications. To keep pace with these service enhancements, such devices have become more powerful and more complex. Certain electronic devices now commonly include a system-on-chip (SoC) having a plurality of processing systems and circuits embedded on a substrate (e.g., one or more central processing units (CPUs), a graphics processing unit (GPU), digital signal processors (DSPs), a memory controller, a speaker amplifier, a modem, etc.) and/or integrated into a chip package.

Haptic actuators are readily available on most electronic devices and typically render haptic feedback in response to a touch event on a touch-enabled display, as a notification, or as a gaming effect on haptic-enabled games. Haptic feedback is a method of providing a tactile response, through vibrations generated by a haptic actuator or other stimulation, to a user. Haptic feedback can provide a simulation of a tactile sensation that emulates the response of an object represented in the user interface. Haptic feedback can also provide an indication to a user that an element has been selected, a button has been pressed, a knob has been turned, or a slider has been moved, among other things, when the user is interfacing with a touch screen.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide resonance tracking of an actuator without interrupting the operation of the actuator and enabling reduced power consumption in driving the actuator at the resonance frequency.

Certain aspects of the present disclosure provide an actuator driver circuit. An example actuator driver circuit generally includes a driver and calibration circuitry. The driver has at least one output for coupling to at least one input of an actuator. The calibration circuitry is configured to: detect a phase of a voltage signal at the at least one output of the driver, detect a phase of a current signal at the at least one output of the driver, determine a phase difference between the phase of the voltage signal and the phase of the current signal, and adjust a frequency of an oscillating signal for the driver, based at least in part on the phase difference.

Certain aspects of the present disclosure provide a speaker amplifier integrated circuit (IC). An example speaker amplifier IC generally includes an actuator driver circuit as described herein.

Certain aspects of the present disclosure provide an electronic device. An example electronic device generally includes an actuator and an actuator driver circuit as described herein, wherein at least one input of the actuator is electrically coupled to at least one output of a driver of the actuator driver circuit.

Certain aspects of the present disclosure provide a method of driving an actuator with a driver. An example method generally includes detecting, with calibration circuitry, a phase of a voltage signal output by the driver, and detecting, with the calibration circuitry, a phase of a current signal output by the driver. The method also includes determining, with the calibration circuitry, a phase difference between the phase of the voltage signal and the phase of the current signal. The method further includes adjusting, with the calibration circuitry, a frequency of an oscillating signal for the driver, based at least in part on the phase difference, and outputting, from the driver for driving the actuator, a driver signal having the adjusted frequency of the oscillating signal.

Certain aspects of the present disclosure provide an apparatus for haptic feedback. An example apparatus generally includes means for driving an actuator, means for detecting a phase of a voltage signal output by the means for driving, means for detecting a phase of a current signal output by the means for driving, means for determining a phase difference between the phase of the voltage signal and the phase of the current signal, and means for adjusting a frequency of an oscillating signal for the means for driving, based at least in part on the phase difference, wherein the means for driving is configured to drive the actuator at the adjusted frequency of the oscillating signal.

According to certain aspects, the apparatus may further include means for integrating the phase difference. In this case, the means for adjusting the frequency may be configured to adjust the frequency of the oscillating signal based at least in part on the integrated phase difference.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
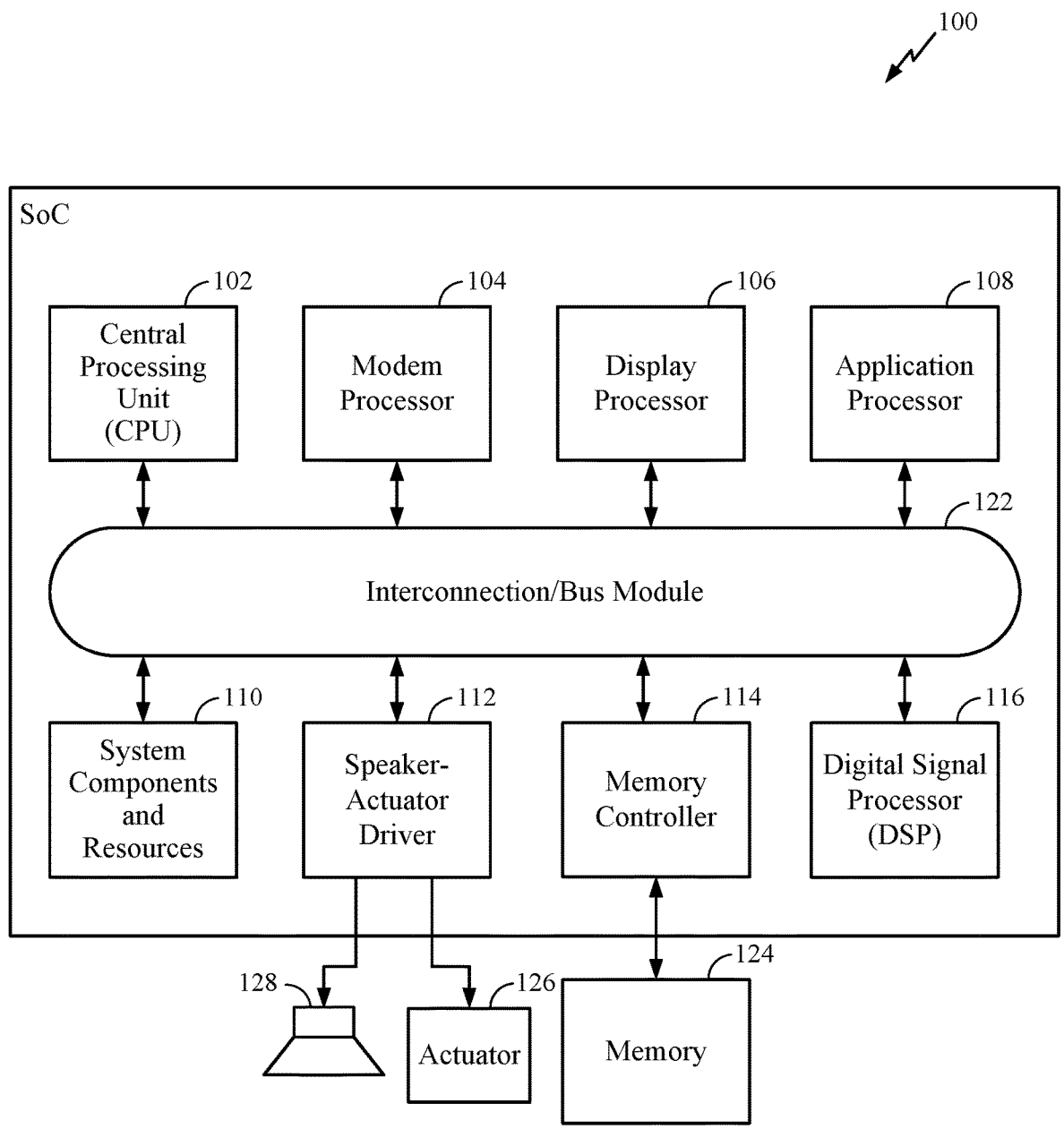
FIG. 1 is a block diagram of example components and interconnections in a system-on-chip (SoC), in accordance with certain aspects of the present disclosure.

Aspects of the present disclosure generally relate to techniques and apparatus for driving an actuator, which may include an actuator driver circuit and a method of driving an actuator with a driver. A haptic feedback device often applies an oscillating signal to an actuator (e.g., a linear resonance actuator (LRA)) to generate a vibration. Certain actuators, such as an LRA, may have a resonance frequency where the actuator will vibrate at a higher amplitude than when the same voltage is applied at other frequencies. For example, the equivalent circuit of an LRA may include an inductor-capacitor (LC) resonant circuit, such that the resonance frequency for an ideal LRA is $$\frac{1}{2\pi\sqrt{LC}}.$$

It is desirable to drive the actuator at the resonance frequency to consume the least amount of power for a certain haptic event. In the field, the resonance frequency of the LRA is often unpredictable and susceptible to changing with various characteristics of the operating environment. For example, the resonance frequency of the LRA may change with the temperature, age (e.g., the total operating hours of the LRA), and voltage applied to the LRA. The grip applied to the electronic device, in which the LRA is employed, by the user may also change the resonance frequency of the LRA. In other words, any counteracting force to the LRA, such as the user's grip, may affect the resonance frequency.

In certain cases, the resonance frequency may be estimated by periodically placing the LRA in a high-impedance (Hi-Z) state and measuring the back electromotive force (EMF) of the LRA. For example, a zero-cross detection method or a quarter wave drive method may be used to detect the resonance frequency by measuring the back EMF of the LRA. Such detection methods may use a certain amount of time to measure resonance frequency, and as a result, there may be interruptions in the time available for haptic feedback due to the back EMF measurements for tracking the resonance frequency.

Certain aspects of the present disclosure provide an actuator driver circuit that continuously tracks the resonance frequency of the LRA without any interruptions due to the frequency tracking. For example, the actuator driver circuit described herein may continuously track the resonance frequency through feedback from a phase detector detecting a phase difference between the voltage and current signals at the input to the LRA. As the LRA is effectively an LC resonant circuit, the voltage and current signals at the input to the LRA may be in phase at the resonance frequency. Under an LC resonant circuit model of the LRA, for operating frequencies lower than the resonance frequency, the phase of the voltage signal may lead the phase of the current signal. For operating frequencies higher than the resonance frequency, the phase of the current signal may lead the phase of the voltage signal. The phase difference between the voltage signal and current signal may indicate how to adjust the operating frequency to track the resonance frequency in a feedback loop as further described herein. With the actuator driver circuit described herein, the LRA may be continuously driven at the resonance frequency (i.e., without any interruptions for measuring the resonance frequency) providing an efficient drive signal from a power consumption perspective.

Example System-On-Chip

FIG. 1 is a block diagram of example components and interconnections in a system-on-chip (SoC) 100 suitable for implementing various aspects of the present disclosure. In aspects, a speaker-actuator driver 112 may be integrated with the SoC 100. The speaker-actuator driver 112 may have one or more amplifiers configured to drive an actuator 126 (e.g., an LRA) and/or a speaker 128. The speaker-actuator driver 112 may include an actuator driver circuit (not shown in FIG. 1) configured to track the resonance frequency of the actuator 126, as further described herein with respect to FIGS. 2-5. In certain cases, the speaker-actuator driver 112 may provide an output power for the speaker 128. With the integrated drivers for the actuator 126 and speaker 128, the speaker-actuator driver 112 may provide haptic feedback that is synchronized with the audio output of the SoC. For example, the speaker-actuator driver 112 may drive the actuator 126 and speaker 128 concurrently without a noticeable delay between the haptic feedback and audio output, which may be desirable in gaming applications, for example.

The SoC 100 may include a number of heterogeneous processors, such as a central processing unit (CPU) 102, a modem processor 104, a display processor 106 (e.g., a graphics processing unit (GPU) or graphics processor), an application processor 108, and a digital signal processor 116. Each processor 102, 104, 106, 108, 116, may include one or more cores, and each processor/core may perform operations independent of the other processors/cores. Each processor 102, 104, 106, 108, 116 may be part of a subsystem (not shown) including one or more processors, caches, etc. configured to handle certain types of tasks or computations. It should be noted that SoC 100 may include additional processors (not shown) or may include fewer processors (not shown).

The SoC 100 may include system components and resources 110 for managing sensor data, analog-to-digital conversions, wireless data transmissions, and for performing other specialized operations (e.g., decoding high-definition video, video processing, artificial intelligence, etc.). System components and resources 110 may also include components such as voltage regulators, oscillators, phase-locked loops, peripheral bridges, data controllers, system controllers, access ports, timers, and other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include system components and resources 110, the speaker-actuator driver 112, one or more memory controllers 114 (e.g., a dynamic random access memory (DRAM) memory controller). The SoC 100 may also include an input/output (IO) module (not shown) for communicating with resources external to the SoC, such as a clock and a voltage regulator, each of which may be shared by two or more of the internal SoC components.

The processors 102, 104, 106, 108, 116 may be interconnected to system components and resources 110, the speaker-actuator driver 112, the memory controller 114, and other system components via an interconnection/bus module 122, which may include an array of reconfigurable logic gates and/or implement a bus architecture (e.g., CoreConnect, AMBA, etc.). Communications may also be provided by advanced interconnects, such as high performance networks-on chip (NoCs).

The interconnection/bus module 122 may include or provide a bus mastering system configured to grant SoC components (e.g., processors, peripherals, etc.) exclusive control of the bus (e.g., to transfer data) for a set duration, number of operations, number of bytes, etc. In an aspect, the bus module 122 may include a direct memory access (DMA) controller (not shown) that enables components connected to the bus module 122 to operate as a master component and initiate memory transactions. The bus module 122 may also implement an arbitration scheme to prevent multiple master components from attempting to drive the bus simultaneously.

The memory controller 114 may be a specialized hardware module configured to manage the flow of data to and from a memory 124. The memory controller 114 may include logic for interfacing with the memory 124, such as selecting a row and column in a cell array of the memory 124 corresponding to a memory location, reading or writing data to the memory location, etc. The memory 124 may be an on-chip component (e.g., on the substrate, die, integrated chip, etc.) of the SoC 100, or alternatively (as shown) an off-chip component.

While the speaker-actuator driver of FIG. 1 is described with respect to a SoC to facilitate understanding, aspects of the speaker-actuator driver and/or the actuator driver circuit described herein may be implemented in various electronic devices, including but not limited to, a video game controller, a mobile phone, a tablet, a watch, a touchscreen, or a touchpad. In other words, an electronic device (e.g., the SoC 100, a video game controller, a mobile phone, a tablet, a watch, a touchscreen, or a touchpad) may include a haptic feedback circuit having an actuator (e.g., an LRA) and the actuator driver circuit as further described herein.

Example Actuator Driver

Figure 2:
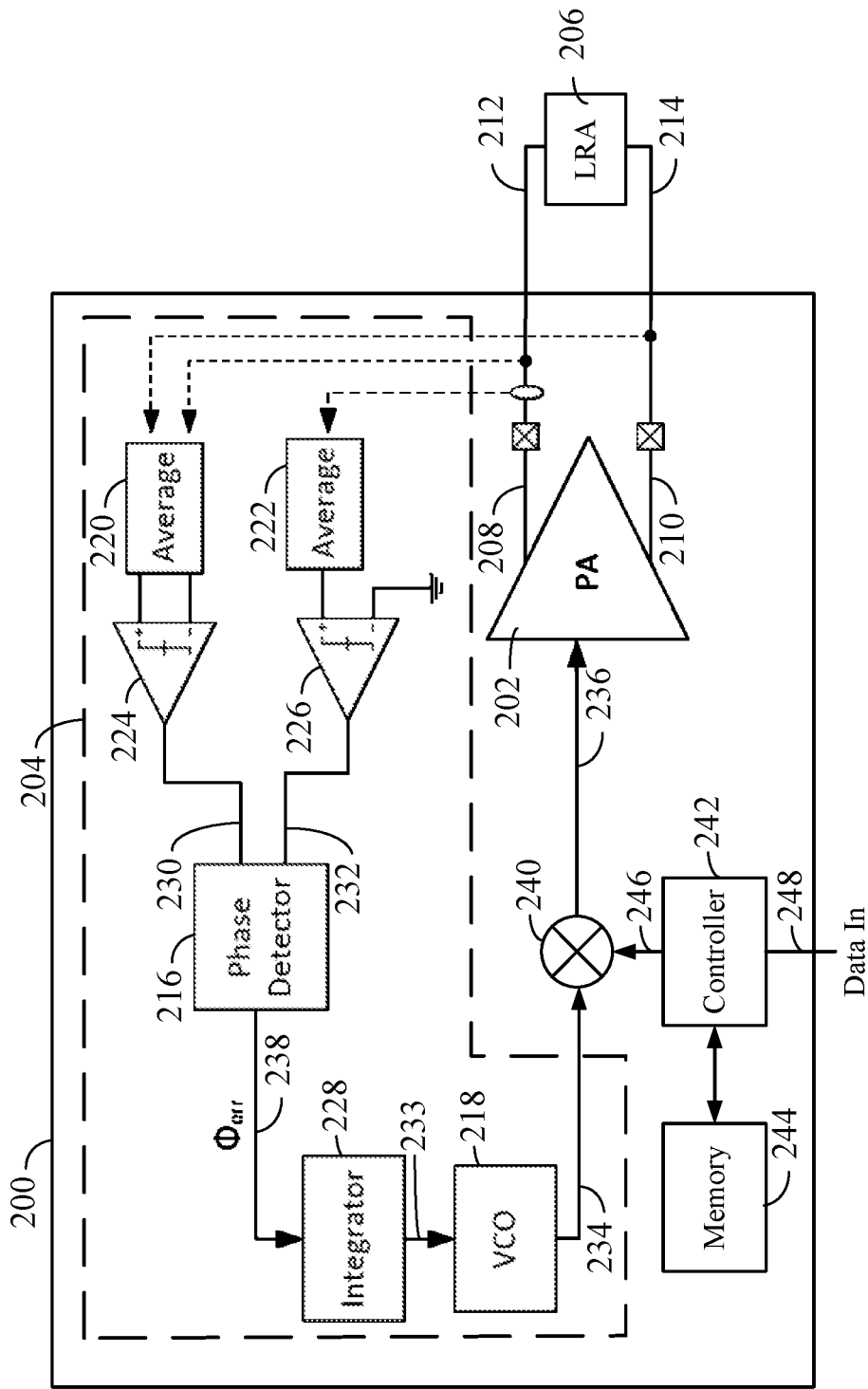
FIG. 2 is a block diagram illustrating an example actuator driver circuit, in accordance with certain aspects of the present disclosure.

FIG. 2 is a diagram illustrating an example actuator driver circuit 200, in accordance with certain aspects of the present disclosure. As shown, the actuator driver circuit 200 includes a driver 202 and calibration circuitry 204. In certain aspects, the actuator driver circuit 200 may also include a mixer 240, a controller 242, and memory 244. In certain aspects, the actuator driver circuit 200 may be electrically coupled to an actuator 206 (e.g., an LRA).

The driver 202 may include one or more amplifiers, such as operational amplifier(s) and/or power amplifiers. In certain cases, the driver 202 may be a Class-D amplifier. In certain cases, the driver 202 may include amplifiers that provide a differential output to the actuator 206. The driver 202 has at least one output (a first output 208 and a second output 210) for coupling to at least one input (a first input 212 and a second input 214) of the actuator 206.

The calibration circuitry 204 tracks the resonance frequency of the actuator 206 based on the phase difference between the phases of the voltage signal and current signal at the output of the driver 202, for input to the actuator. For example, the calibration circuitry 204 may include various circuits for detecting the phase of the voltage signal (e.g., across the differential output signals of the driver 202), detecting the phase of the current signal, determining the phase difference between the phase of the voltage signal and the phase of the current signal, and adjusting the frequency of an oscillating signal for the driver. In other words, the calibration circuitry 204 may be configured to detect a phase of a voltage signal at the at least one output of the driver and detect a phase of a current signal at the at least one output of the driver. The calibration circuitry 204 may also be configured to determine a phase difference between the phase of the voltage signal and the phase of the current signal, and adjust a frequency of an oscillating signal for the driver, based at least in part on the phase difference. That is, the calibration circuitry 204 may adjust the frequency of a driving signal, which drives the driver 202, which in turn drives the actuator 206.

In aspects, the calibration circuitry 204 may include a phase detector 216 and a voltage-controlled oscillator (VCO) 218. For other aspects, the VCO 218 may be considered as separate from the calibration circuitry 204. The phase detector 216 may detect the phase difference between the phase of the voltage signal and the phase of the current signal across the actuator 206. In certain cases, the phase detector 216 may generate a voltage proportional to the phase difference between the phase of the voltage signal and the phase of the current signal across the actuator 206. The phase detector 216 may include at least one input (first input 230 and second input 232) electrically coupled to the at least one output of the driver 202.

The VCO 218 may be an oscillator that generates an oscillating signal with varying frequency based on an input voltage applied to the oscillator. In certain cases, the VCO 218 may have an internal integrator function, such that the VCO 218 is a VCO-based integrator. The VCO 218 may be configured to generate the oscillating signal for the driver 202. For example, an output 234 of the VCO may be coupled to an input 236 of the driver 202 through the mixer 240. In aspects, the calibration circuitry 204 may be configured to adjust a frequency of the oscillating signal output by the VCO, based at least in part on the phase difference between the phase of the voltage signal and the phase of the current signal across the actuator 206.

In aspects, the mixer 240 may be a frequency mixer. The mixer 240 may be electrically coupled between the output 234 of the VCO 218 and the input of the driver 202. The mixer 240 multiplies the oscillating signal (e.g., a local oscillating (LO) frequency) output by the VCO 218 with a control signal output by the controller 242 to amplitude modulate the oscillating signal to a vibration pattern for the actuator 206. In other words, the oscillating signal output by the VCO 218 represents the carrier frequency, and the control signal output by the controller 242 may be a pulse-width modulated (PWM) signal with a variable amplitude. The signal output by the mixer 240 may be an amplitude-modulated signal with a carrier frequency at the resonance frequency of the actuator 206, in steady state for example, and an amplitude corresponding to the amplitude of the control signal. In other words, the amplitude of the control signal output by the controller may provide the amplitude of the vibration pattern for the actuator 206.

The controller 242 may be coupled to the mixer 240 and provide a pulse-width modulated signal for modulating the carrier frequency of the VCO 218. In certain cases, the controller 242 may have an output 246 coupled to the mixer 240 and an input 248 for obtaining data from a processor, such as the application processor 108 of FIG. 1. For example, the application processor 108 may trigger the controller 242 to output the PWM control signal via the input 248. In certain cases, the application processor 108 may provide a codeword indicative of a certain waveform for the controller 242 to output. The controller 242 may be a processor, a digital signal processor (DSP), an application specific integrated circuit (ASIC), a field programmable gate array (FPGA) or other programmable logic device (PLD), discrete gate or transistor logic, discrete hardware components, or any combination thereof.

In certain aspects, the controller 242 may be coupled to the memory 244, which may store data and program codes for operating the actuator driver circuit 200. For example, the memory 244 may store various waveforms associated with vibration patterns for driving the actuator 206. The memory 244 may include, by way of example, Random Access Memory (RAM), flash memory, Read Only Memory (ROM), Programmable Read-Only Memory (PROM), Erasable Programmable Read-Only Memory (EPROM), Electrically Erasable Programmable Read-Only Memory (EEPROM), registers, any other suitable storage medium, or any combination thereof.

In certain aspects, the calibration circuitry 204 may also include a voltage-averaging circuit 220, a current-averaging circuit 222, a first comparator 224, and a second comparator 226. In aspects, the calibration circuitry 204 may average in the time domain the current and voltage input to the actuator 206 with the voltage-averaging circuit 220 and current-averaging circuit 222, respectively. As the driver 202 may be implemented as a Class-D amplifier for efficiency, the signal output by the driver 202 may be pulse-width modulated at a high-frequency carrier. The voltage-averaging and current-averaging circuits 220, 222 may reduce or eliminate the high-frequency content from the output signal of the driver 202, which may prevent the phase detector 216 from detecting a false trigger in the phase difference. The first and second comparators 224, 226 may generate square-wave signals indicative of the phase of the (averaged) voltage signal and phase of the (averaged) current signal, respectively. The phase detector 216 may be used to compare the phases of the current and voltage signals and generate a signal indicative of the phase difference ($\Phi_{err}$). The phase difference $\Phi_{err}$ may be integrated with an integrator circuit 228, and the integrator output may be used to control the frequency of the oscillating signal output by the VCO 218. For example, the calibration circuitry 204 may employ a Type II loop by adding a discrete integrator with the integrator circuit 228 in the loop to drive the phase difference ($\Phi_{err}$) to zero (within a suitable tolerance range) at steady state.

The voltage-averaging circuit 220 may be electrically coupled between the input 230 of the phase detector 216 and the outputs 208, 210 of the driver 202. In aspects, the voltage-averaging circuit 220 may be electrically coupled between the driver 202 and the first comparator 224. The voltage-averaging circuit 220 may generate an averaged voltage signal indicative of an average of the voltage signal in the time domain at the outputs 208, 210 of the driver. In aspects, the voltage-averaging circuit 220 may reduce or eliminate high-frequency voltage content at the outputs 208, 210. The voltage-averaging circuit 220 may be implemented as a low-pass filter. The phase detector 216 may be configured to determine the phase difference between the phase of the voltage signal and the phase of the current signal based in part on the averaged voltage signal.

The current-averaging circuit 222 may be electrically coupled between the input 232 of the phase detector 216 and at least one output (e.g., the first output 208) of the driver 202. In aspects, the current-averaging circuit 222 may be electrically coupled between the driver 202 and the second comparator 226. The current-averaging circuit 222 may generate an averaged current signal indicative of an average of the current signal in the time-domain at the at least one output of the driver 202. The current-averaging circuit 222 may be implemented as a shunt capacitor that diverts high-frequency current content at the output 208 to ground. In certain cases, the current-averaging circuit may be implemented as a low-pass filter that reduces or eliminates high-frequency current content at the output 208. In aspects, the phase detector may be configured to determine the phase difference between the phase of the voltage signal and the phase of the current signal based in part on the averaged current signal and/or the averaged voltage signal.

The first comparator 224 may be electrically coupled between the first input 230 of the phase detector 216 and at least one output (e.g., the first output 208 and the second output 210) of the driver 202. In aspects, the first comparator 224 may be configured to generate a first signal indicative of the phase of the voltage signal. For example, the first comparator 224 may generate a signal representative of the zero-crossings of the averaged voltage signal, such as a square-wave signal that goes high or low at each zero crossing of the averaged voltage signal. The second comparator 226 may be electrically coupled between the second input 232 of the phase detector 216 and at least one output (e.g., the first output 208) of the driver 202. The second comparator 226 may generate a second signal indicative of the phase of the current signal. For example, the second comparator 226 may generate a signal representative of the zero-crossings of the averaged current signal, such as a square-wave signal that goes high or low at each zero crossing of the averaged current signal.

The integrator circuit 228 may be electrically coupled between an output 238 of the phase detector 216 and an input 233 of the VCO 218. The integrator circuit 228 may enable the calibration circuitry 204 to gradually respond to differences in phases between the current and voltage signals. The integrator circuit 228 may generate a control signal indicative of an integral of the phase difference output by the phase detector 216. In aspects, the calibration circuitry 204 may provide a Type II loop with a discrete integrating function through the integrator circuit 228. In certain cases, the calibration circuitry 204 may have an internal integrating function within the VCO 218 and a discrete integrating function through the integrator circuit 228. That is, the VCO 218 and the integrator circuit 228 may provide a double integral on the feedback loop, which may drive the phase error to zero in steady state. The integrator circuit 228 may be an integrator amplifier circuit (e.g., a resistor-capacitor (RC) operational amplifier (op-amp) integrator circuit) that generates a voltage signal proportional to the integral of the input signal. In aspects, the calibration circuitry 204 may be configured to adjust the frequency of the oscillating signal for the driver, based at least in part on the integral of the phase difference.

While the example calibration circuitry 204 is described with respect to employing an integral controller for controlling the output frequency of the VCO to facilitate understanding, aspects of the present disclosure may also apply to other suitable techniques for controlling the output frequency of the VCO, such as a proportional-integral-derivative (PID) controller and/or a proportional controller.

Figure 3:
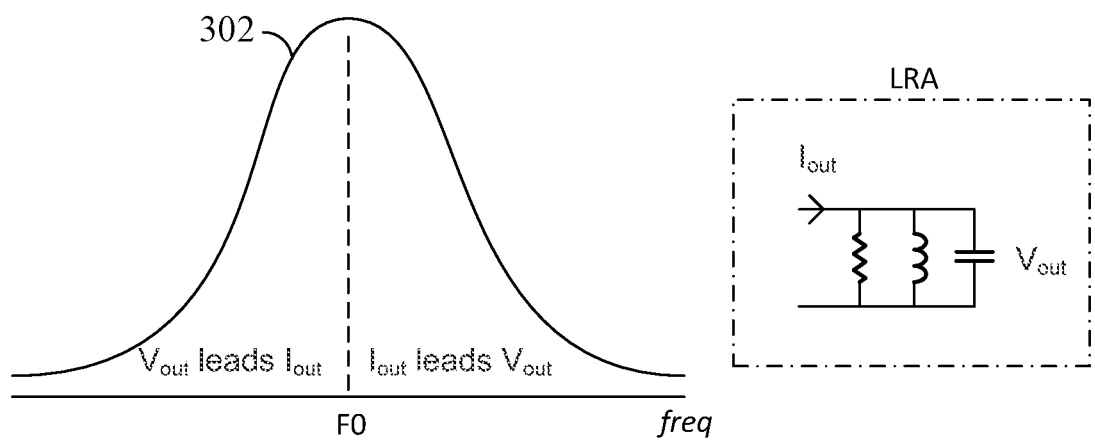
FIG. 3 is a graph depicting a frequency response of an equivalent resonant circuit for an actuator, in accordance with certain aspects of the present disclosure.

FIG. 3 is a graph depicting a frequency response of an equivalent LC resonant circuit for an LRA, in accordance with certain aspects of the present disclosure. As shown, the curve 302 represents the magnitude of the vibration output by the LRA versus the frequency of the input signal applied to the LRA. The frequency response of the LRA provides a peak magnitude vibration at the resonance frequency (FO). As previously described, for operating frequencies lower than the resonance frequency FO, the phase of the voltage signal may lead the phase of the current signal. For operating frequencies higher than the resonance frequency, the phase of the current signal may lead the phase of the voltage signal. The frequency response as depicted in FIG. 3 demonstrates that the phase difference between the current and voltage signals may indicate how to adjust the operating frequency of the LRA.

Figure 4:
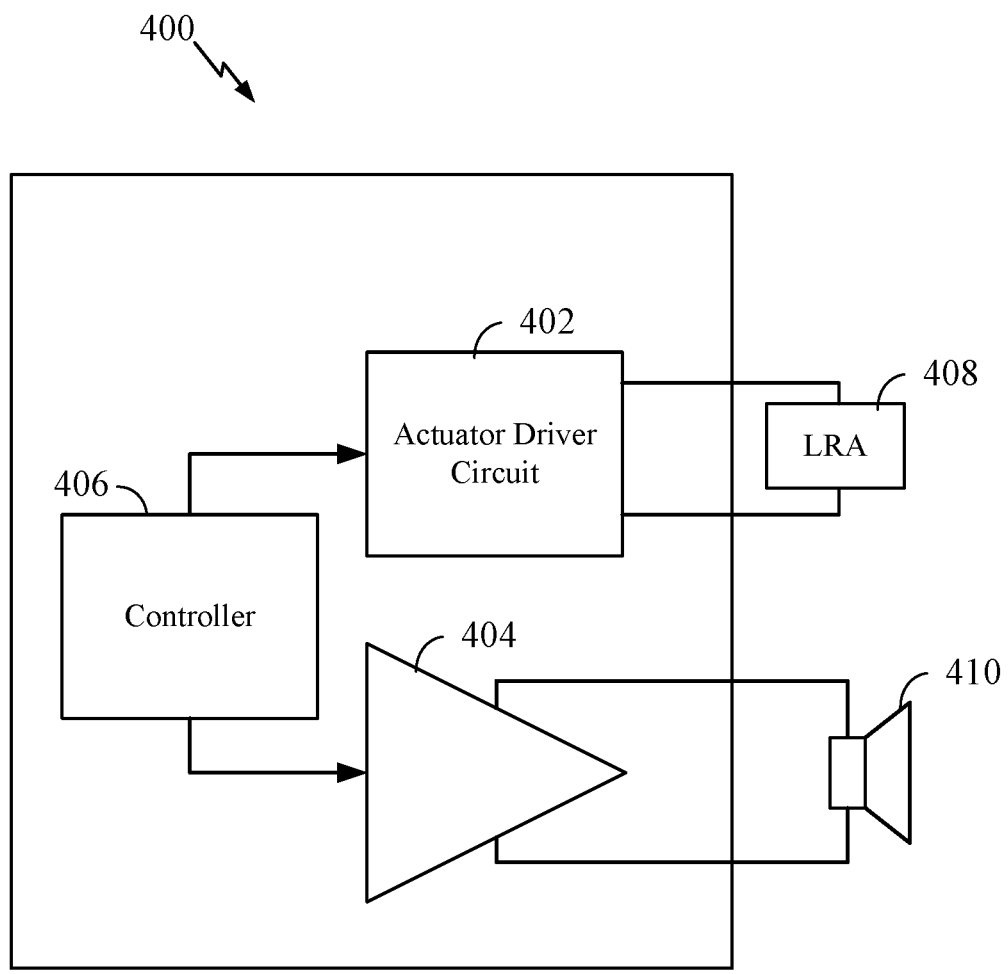
FIG. 4 is a block diagram illustrating a speaker amplifier circuit integrated circuit (IC), in accordance with certain aspects of the present disclosure.

In certain aspects, the actuator driver circuit described herein may be integrated with a speaker amplifier circuit. For example, FIG. 4 is a diagram illustrating a speaker amplifier integrated circuit (IC) 400, in accordance with certain aspects of the present disclosure. As shown, the speaker amplifier IC 400 comprises an actuator driver circuit 402 (e.g., the actuator driver circuit 200 with calibration circuitry 204), a speaker amplifier circuit 404, and a controller 406. In aspects, the speaker amplifier IC 400 may be coupled to an actuator 408 (e.g., an LRA) and a speaker 410. For instance, the actuator driver circuit 402 may be coupled to the actuator 408, and the speaker amplifier circuit 404 may be coupled to the speaker 410. The controller 406 may control when and how to operate the actuator driver circuit 402 and/or the speaker amplifier circuit 404. For example, the controller 406 may facilitate simultaneous output by the actuator driver circuit 402 and speaker amplifier circuit 404, such that the actuator 408 and speaker 410 provide coordinated haptic and audio feedback to a user.

Figure 5:
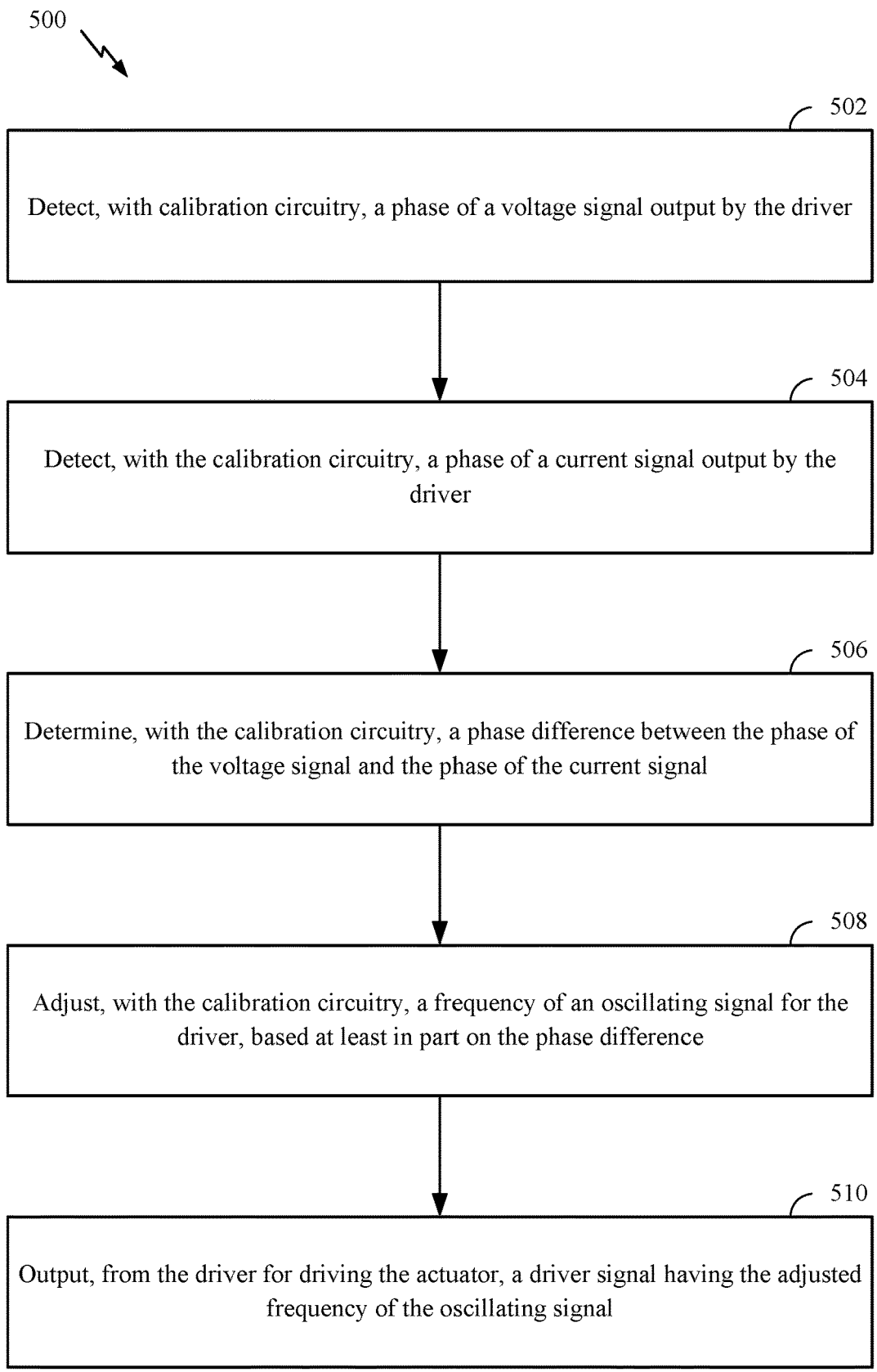
FIG. 5 is a flow diagram of example operations for driving an actuator with a driver, in accordance with certain aspects of the present disclosure.

FIG. 5 is a flow diagram of example operations 500 for driving an actuator with a driver (e.g., the driver 202), in accordance with certain aspects of the present disclosure. The operations 500 may be performed by an actuator driver circuit (e.g., the actuator driver circuit 200), a speaker amplifier circuit (e.g., the speaker amplifier IC 400), a SoC (e.g., the SoC 100), or various electronic devices including the actuator driver circuit and the actuator, for example.

The operations 500 begin, at block 502, where calibration circuitry (e.g., the calibration circuitry 204) detects a phase of a voltage signal output by a driver (e.g., the driver 202). At block 504, the calibration circuitry detects a phase of a current signal output by the driver. At block 506, the calibration circuitry determines a phase difference between the phase of the voltage signal and the phase of the current signal. At block 508, the calibration circuitry adjusts a frequency of an oscillating signal for the driver, based at least in part on the phase difference. At block 510, the driver outputs a driver signal having the adjusted frequency of the oscillating signal.

In aspects, the calibration circuitry may average the voltage and/or current signals. For example, the operations 500 may also include averaging the voltage signal with a voltage-averaging circuit (e.g., the voltage-averaging circuit 220). In certain aspects, the calibration circuitry 204 may determine, at block 506, the phase difference between the phase of the voltage signal and the phase of the current signal based in part on the averaged voltage signal. In certain cases, the calibration circuitry may average the current signal with a current-averaging circuit (e.g., the current-averaging circuit 222). In aspects, the calibration circuitry may determine the phase difference between the phase of the voltage signal and the phase of the current signal based in part on the averaged current signal.

In aspects, the calibration circuitry may detect the phase of the voltage and current signals with comparators (e.g., the first and second comparators 224, 226). For instance, the calibration circuitry may generate, with a first comparator, a first signal indicative of the phase of the voltage signal and generate, with a second comparator, a second signal indicative of the phase of the current signal. In aspects, the calibration circuitry may determine the phase difference between the phase of the voltage signal and the phase of the current signal based at least in part on the first signal and the second signal.

In aspects, the calibration circuitry may employ an integral controller in order to control the frequency of the oscillating signal for the driver. For instance, the calibration circuitry may integrate the phase difference with an integrator circuit (e.g., the integrator circuit 228). The calibration circuitry may adjust the frequency of the oscillating signal based at least in part on the integrated phase difference.

In aspects, the calibration circuitry may include a VCO (e.g., the VCO 218) to output the oscillating signal for the driver. In certain cases, the calibration circuitry may tune an oscillator based at least in part on the integrated phase difference.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

For example, means for driving an actuator may include a driver (e.g., the driver 202). Means for detecting a phase of a voltage signal output by the means for driving may include a comparator (e.g., the first comparator 224) and, in certain aspects, a voltage-average circuit (e.g., the voltage-averaging circuit 220). Means for detecting a phase of a current signal output by the means for driving may include a comparator (e.g., the second comparator 226) and, in certain aspects, a current-average circuit (e.g., the current-averaging circuit 222). Means for determining a phase difference between the phase of the voltage signal and the phase of the current signal may include a phase detector (e.g., the phase detector 216). Means for adjusting a frequency of an oscillating signal for the means for driving, based at least in part on the phase difference may include an integrator circuit (e.g., the integrator circuit 228) and a VCO (e.g., the VCO 218). In aspects, the means for driving the actuator may be configured to drive the actuator at the adjusted frequency of the oscillating signal. Means for averaging the voltage signal may include a voltage-averaging circuit (e.g., the voltage-averaging circuit 220), and means for averaging the current signal may include a current-averaging circuit (e.g., the current-averaging circuit 222). In aspects, the means for determining the phase difference may be configured to determine the phase difference between the phase of the voltage signal and the phase of the current signal based at least in part on the averaged current signal and the averaged voltage signal. Means for generating a first signal indicative of the phase of the voltage signal may include a comparator (e.g., the first comparator 224), and means for generating a second signal indicative of the phase of the current signal may include a comparator (e.g., the second comparator 226). In aspects, the means for determining the phase difference may be configured to determine the phase difference between the phase of the voltage signal and the phase of the current signal based at least in part on the first signal and the second signal. Means for integrating the phase difference may include an integrator circuit (e.g., the integrator circuit 228). In aspects, the means for adjusting the frequency may be configured to adjust the frequency of the oscillating signal based at least in part on the integrated phase difference.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to an integrated circuit (IC) chip that contains multiple resources and/or processors integrated on a substrate. A SoC may include circuitry for digital, analog, mixed-signal, and radio-frequency functions. A SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

The various aspects may be implemented in a wide variety of computing systems, including single processor systems, multiprocessor systems, multicore processor systems, systems-on-chip (SoC), or any combination thereof.

The various embodiments are described in detail with reference to the accompanying drawings. Wherever possible, the same reference numbers are be used throughout the drawings to refer to the same or like parts. References made to particular examples and implementations are for illustrative purposes, and are not intended to limit the scope of the invention or the claims.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An actuator driver circuit comprising:
    a driver having at least one output for coupling to at least one input of an actuator; and
    calibration circuitry configured to:
        detect a phase of a voltage signal at the at least one output of the driver;
        detect a phase of a current signal at the at least one output of the driver;
        determine a phase difference between the phase of the voltage signal and the phase of the current signal; and
        adjust a frequency of an oscillating signal for the driver, based at least in part on the phase difference.

2. The actuator driver circuit of claim 1, wherein the calibration circuitry comprises a phase detector having at least one input electrically coupled to the at least one output of the driver and configured to determine the phase difference between the phase of the voltage signal and the phase of the current signal.

3. The actuator driver circuit of claim 2, wherein:
    the calibration circuitry further comprises a voltage-averaging circuit electrically coupled between the at least one input of the phase detector and the at least one output of the driver and configured to generate an averaged voltage signal indicative of an average of the voltage signal at the at least one output of the driver; and
    the phase detector is configured to determine the phase difference between the phase of the voltage signal and the phase of the current signal based in part on the averaged voltage signal.

4. The actuator driver circuit of claim 2, wherein:
    the calibration circuitry further comprises a current-averaging circuit electrically coupled between the at least one input of the phase detector and the at least one output of the driver and configured to generate an averaged current signal indicative of an average of the current signal at the at least one output of the driver; and
    the phase detector is configured to determine the phase difference between the phase of the voltage signal and the phase of the current signal based in part on the averaged current signal.

5. The actuator driver circuit of claim 2, wherein the calibration circuitry further comprises:
    a first comparator electrically coupled between the at least one input of the phase detector and the at least one output of the driver and configured to generate a first signal indicative of the phase of the voltage signal; and a second comparator electrically coupled between the at least one input of the phase detector and the at least one output of the driver and configured to generate a second signal indicative of the phase of the current signal.

6. The actuator driver circuit of claim 2, further comprising a voltage-controlled oscillator (VCO) configured to generate an oscillating signal for the driver, wherein the calibration circuitry is configured to adjust a frequency of the oscillating signal, based at least in part on the phase difference.

7. The actuator driver circuit of claim 6, wherein:
the calibration circuitry further comprises an integrator circuit electrically coupled between an output of the phase detector and an input of the VCO and configured to generate a control signal indicative of an integral of the phase difference; and
the calibration circuitry is configured to adjust the frequency of the oscillating signal for the driver, based at least in part on the integral of the phase difference.

8. A speaker amplifier integrated circuit comprising the actuator driver circuit of claim 1.

9. An electronic device comprising a haptic feedback circuit having the actuator, wherein the at least one input of the actuator is electrically coupled to the at least one output of the driver of the actuator driver circuit of claim 1.

10. The electronic device of claim 9, wherein the actuator is a linear resonance actuator.

11. The electronic device of claim 10, wherein the electronic device comprises at least one of a video game controller, a mobile phone, a tablet, a watch, a touchscreen, or a touchpad.

12. A method of driving an actuator with a driver, comprising:
detecting, with calibration circuitry, a phase of a voltage signal output by the driver;
detecting, with the calibration circuitry, a phase of a current signal output by the driver;
determining, with the calibration circuitry, a phase difference between the phase of the voltage signal and the phase of the current signal;
adjusting, with the calibration circuitry, a frequency of an oscillating signal for the driver, based at least in part on the phase difference; and
outputting, from the driver for driving the actuator, a driver signal having the adjusted frequency of the oscillating signal.

13. The method of claim 12, further comprising averaging the voltage signal, wherein determining the phase difference comprises determining the phase difference between the phase of the voltage signal and the phase of the current signal based in part on the averaged voltage signal.

14. The method of claim 12, further comprising averaging the current signal, wherein determining the phase difference comprises determining the phase difference between the phase of the voltage signal and the phase of the current signal based in part on the averaged current signal.

15. The method of claim 12, further comprising:
generating, with a first comparator, a first signal indicative of the phase of the voltage signal; and
generating, with a second comparator, a second signal indicative of the phase of the current signal, wherein determining the phase difference comprises determining the phase difference between the phase of the voltage signal and the phase of the current signal based at least in part on the first signal and the second signal.

16. The method of claim 12, further comprising integrating the phase difference, wherein adjusting the frequency comprises adjusting the frequency of the oscillating signal based at least in part on the integrated phase difference.

17. The method of claim 16, wherein adjusting the frequency comprises tuning an oscillator based at least in part on the integrated phase difference.

18. An apparatus for haptic feedback, comprising:
means for driving an actuator;
means for detecting a phase of a voltage signal output by the means for driving;
means for detecting a phase of a current signal output by the means for driving;
means for determining a phase difference between the phase of the voltage signal and the phase of the current signal; and
means for adjusting a frequency of an oscillating signal for the means for driving, based at least in part on the phase difference, wherein the means for driving is configured to drive the actuator at the adjusted frequency of the oscillating signal.

19. The apparatus of claim 18, further comprising:
means for averaging the voltage signal; and
means for averaging the current signal, wherein the means for determining the phase difference is configured to determine the phase difference between the phase of the voltage signal and the phase of the current signal based at least in part on the averaged current signal and the averaged voltage signal.

20. The apparatus of claim 18, further comprising:
means for generating a first signal indicative of the phase of the voltage signal; and means for generating a second signal indicative of the phase of the current signal, wherein the means for determining the phase difference is configured to determine the phase difference between the phase of the voltage signal and the phase of the current signal based at least in part on the first signal and the second signal.

* * * * *